(No Model.)

W. A. BOLE.
PIPE COUPLING.

No. 332,184. Patented Dec. 8, 1885.

ATTEST.
J. Henry Kaiser.
Harry L. Amer.

INVENTOR.
William A. Bole,
by Snowden Bell.
Assoc. Attorney.

UNITED STATES PATENT OFFICE.

WILLIAM A. BOLE, OF PITTSBURG, PENNSYLVANIA, ASSIGNOR OF ONE-HALF TO RALPH BAGALEY, OF SAME PLACE.

PIPE-COUPLING.

SPECIFICATION forming part of Letters Patent No. 332,184, dated December 8, 1885.

Application filed March 24, 1885. Serial No. 160,021. (No model.)

*To all whom it may concern:*

Be it known that I, WILLIAM A. BOLE, a citizen of the United States, residing at Pittsburg, in the county of Allegheny and State of Pennsylvania, have invented or discovered a certain new and useful Improvement in Pipe-Couplings, of which improvement the following is a specification.

Figure 1:
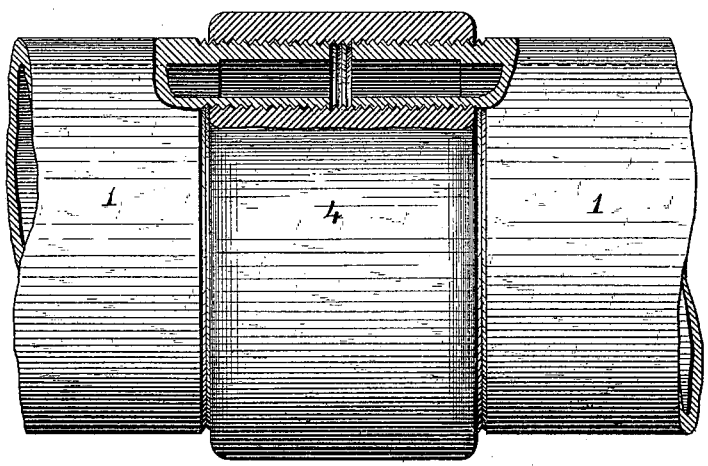
Figure 3:
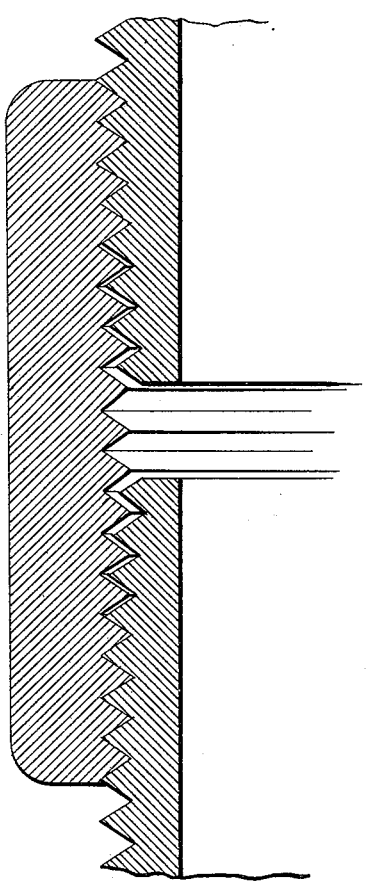
Figure 2:
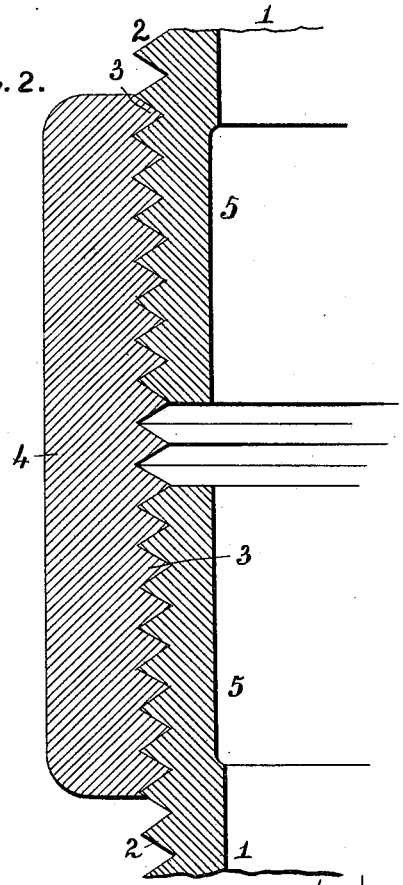

In the accompanying drawings, which make part of this specification, Figure 1 is a side view, partly in longitudinal central section, of a pipe-coupling embodying my invention; Fig. 2, a similar half-section on an enlarged scale; and Fig. 3 a similar half-section, on a correspondingly enlarged scale, through a coupling of the ordinary construction.

In an application for Letters Patent filed by me January 17, 1885, Serial No. 153,152, I have set forth an improved method of coupling pipes, consisting in first effecting the engagement of a pipe-section with a coupling-socket by screwing an external thread upon the pipe-section into an internal thread upon the socket, and thereafter forcing the helical surfaces of the pipe-section and socket into close contact by expanding the thread of the former into the space between the thread-surfaces of the latter by the application of internal pressure.

My present invention consists in a pipe-coupling constructed in the manner above specified, said coupling being shown and described but not, *per se*, claimed in my said application, Serial No. 153,152.

In the practice of my invention I cut upon each length or section 1 of the tubes or pipes which are to be united in a line or series, at and adjacent to each end of said section, an external screw-thread, 2, which may be either cylindrical or tapered, as preferred, and cut an internal screw-thread, 3, of corresponding pitch and section, in the coupling-sockets 4, the socket-threads being without taper if the pipe-threads are cylindrical or but slightly tapered, as in the usual practice; or, if the latter are tapered to any substantial extent, the threads of the socket may be correspondingly tapered from its ends to its center. Each pipe-section is first screwed as tightly as practicable into its socket in the ordinary manner, and after being thus engaged with the socket its threaded surface is forced into close and uniform contact therewith by being radially enlarged or expanded into the threads of the socket by the application of pressure to its inner surface for a distance from its end equal to the whole or any desired portion of the length of its thread, such application of pressure forming a slight internal recess or countersink, 5, on the inside of the pipe, corresponding with the increase in its outer diameter in filling the space between the threads of the socket.

The expansion of the pipe ends may be effected by any suitable device having the capacity of acting upon one end of a length of pipe while operated from the opposite end thereof, an instance being illustrated in the tube-expander of my application Serial No. 154,893, filed February 4, 1885.

I am aware that a plain-surfaced tube having a portion of its length adjacent to its end expanded into a hole or socket, into which it is inserted loosely and without engagement, was known in the art at the date of my invention, and such, therefore, I disclaim.

I claim herein as my invention—

In a pipe-coupling, the combination of the internally-screw-threaded socket and contiguous externally-screw-threaded and radially-enlarged or internally-expanded pipe ends, substantially as set forth and described.

In testimony whereof I have hereunto set my hand.

WILLIAM A. BOLE.

Witnesses:
 J. SNOWDEN BELL,
 R. H. WHITTLESEY.